United States Patent [19]

Cameron

[11] Patent Number: 4,744,619
[45] Date of Patent: May 17, 1988

[54] CONNECTING AND ALIGNING OPTICAL FIBRES AND WAVEGUIDES

[75] Inventor: Keith H. Cameron, Woodbridge, England

[73] Assignee: British Telecommunications public limited company, Great Britain

[21] Appl. No.: 849,505

[22] PCT Filed: Jul. 11, 1985

[86] PCT No.: PCT/GB85/00312
§ 371 Date: Mar. 12, 1986
§ 102(e) Date: Mar. 12, 1986

[87] PCT Pub. No.: WO86/00717
PCT Pub. Date: Jan. 30, 1986

[30] Foreign Application Priority Data

Jul. 13, 1984 [GB] United Kingdom ............ 8417911

[51] Int. Cl.4 .................................................. G02B 6/30
[52] U.S. Cl. ............................... 350/96.17; 350/96.15
[58] Field of Search ............. 350/96.15, 96.17, 96.20

[56] References Cited

U.S. PATENT DOCUMENTS

| 3,774,987 | 11/1973 | Boivin | 350/96 WG |
| 3,994,559 | 11/1976 | Crow | 350/96.17 |
| 4,164,363 | 8/1979 | Hsu | 350/96.17 |
| 4,240,849 | 12/1980 | Kurokawa | 156/73.2 |
| 4,557,557 | 12/1985 | Gleason et al. | 350/96.15 X |
| 4,601,535 | 7/1986 | Tanaka et al. | 350/96.20 |

FOREIGN PATENT DOCUMENTS 0216118 11/1984 German Democratic Rep. ........................ 350/96.15

Primary Examiner—Gene Wan
Assistant Examiner—James C. Lee
Attorney, Agent, or Firm—Nixon & Vanderhye

[57] ABSTRACT

To make a low loss connection between the core (5) of a single mode optical fibre (1) and a waveguide (2) on a waveguide substrate (3), a support block (4) which straddles the waveguide (2) is mounted on the waveguide substrate (3). The end-face (6) of the optical fibre (1) is fixed to both the waveguide substrate (3) and the support block (4) with transparent, light curable, adhesive (8). The support block (4) may be affixed to the substrate (3) with the same adhesive as is used to fix the optical fibre (1) to the substrate (3).

16 Claims, 5 Drawing Sheets

CONNECTING AND ALIGNING OPTICAL FIBRES AND WAVEGUIDES

FIELD OF THE INVENTION

The present invention relates to arrangements for and methods of connecting waveguides, and in particular to connecting optical waveguides of dissimilar structure.

BACKGROUND AND SUMMARY OF THE INVENTION

The invention has an important application in connecting single mode optical fibres to optical components comprising waveguides formed on substrates.

Successful introduction into optical communications systems of optical components on planar substrates, such as, for example, optical waveguides on lithium niobate substrates, often depends among other criteria on the ability to provide interconnection of such components with optical fibres. The interconnection should not only have low losses and be capable of withstanding reasonable mechanical shocks, but should also be advantageously simple and reliable to make.

Where the optical component concerned is, or is similar in structure to, an optical waveguide on a substrate, such an interconnection is particularly difficult to provide. The waveguide is embedded in a surface of the substrate, the end-faces of the substrate being co-planar with the terminations of the waveguide. Because there is no close structural similarity between an optical fibre end and the end-portion of a substrate, the two components being of substantially differing dimensions and cross-sections, special techniques have been developed for making the interconnections.

An arrangement which has produced acceptably low losses between an optical fibre and a waveguide on a substrate is that called "end-fire" coupling. In this arrangement the fibre core is physically aligned with the waveguide and optically coupled directly thereto with no intervening components. Such an arrangement is disclosed by:

ALFERNESS, R. C., RAMASWAMY, V. R., KOROTKY, S. K., DIVINO, M. D., and BUHL, L. L.: "Efficient single-mode fibre to titanium diffused lithium niobate waveguide coupling for I=1.32 μm". IEEE J. Quantum Electron., 1982, QE-18, pp 1807-1813. The technique achieves low losses not only through precise alignment of the fibre end with the waveguide end but also by closely matching the mode-pattern of the wave guide to that of the fibre.

The above technique does not however address the problem of how to fix the fibre end relative to the waveguide while preserving the low losses, and how to do so in a manner suitable for component packaging.

The absence of a readily usable manner of providing the connections between the fibre and waveguide presents, in fact, a major obstacle to the use of the end-fire coupling technique in the packaging of waveguide components, because misalignment resulting in a significant increase in the coupling loss, can easily occur. It should be borne in mind that the fibre cores of single-mode fibres typically have diameters of between 0.005 and 0.01 mm. The waveguides are of similar dimensions, and consequently misalignment of only a few micrometres is sufficient to cause a serious increase in the connection loss.

The search for techniques of providing satisfactory connection has attracted a considerable amount of effort as witnessed by the following disclosures, all of which refer to techniques for connecting the fibre end to a waveguide in the correct spatial relationship:

SHEEM S. K., GIALLEORANI T. G.: "Two-dimensional silicon grooves for altitudinal alignment in fibre end-butt coupling". Optics Letts., 1978, 3, pp 73-752.

BULMER C. H., SHEEM S. K., MOELLER R. P., and BURNS W. K.: "Fabrication of flip-chip optical couplers between single-mode fibre and lithium niobate channel waveguides". IEEE Trans. on Comps. Hybrids and Manuf. Tech., 1981, CHMT-4, pp 350-355.

HSU H. P., MILTON A. F., and BURNS W. K.: "Multiple fibre end fire coupling with single-mode channel waveguides". Appl. Phys. Lett., 1978, 33(7), pp 603-605.

RAMER O. G., NELSON C., and MOHR C.: "Experimental integrated circuit losses and pigtailing of chips" IEEE J. Quantum Electron., 1981, QE-17, pp 970-974.

ARDITTY H. J., BETTINI J. P., GRAINDORGE P., LEFEVRE H. C., PAPUCHON M., BOURBIN Y., VATOUX S., BERARD D., and COLOMBIN J. Y.: "Test results on an integrated fibre-optics gyroscope brass board". IEE conf. Optical Fibre Sensors, Apr. 26-28, 1983, London, UK.

All of the aforementioned references use silicon V-grooves to provide lateral and angular fibre to waveguide alignment, and rely on the use of fibres with highly concentric cores and constant diameters to achieve satisfactory optical coupling. To produce coupling which is independent of concentricity and diameter however, additional vertical alignment is required. One method of achieving this is to use a tapered adjustment fibre lying in a transverse groove under the fibre to be coupled, which provides submicron vertical alignment, as described for example by SHEEM S. K. et al and by BULMER C. H. et al of the above references. Once aligned, the fibre is then fixed into its groove with an epoxy resin.

Although this form of alignment and fixing provides an interconnection of relatively good mechanical strength, it does not surmount the problem mentioned above, i.e. the introduction of misalignment at the fixing stage.

The present invention aims to provide a simple and practical method of, and arrangement for, affixing single mode fibres to waveguides on planar substrates which, moreover, do not need to rely on core concentricity or known diameter of the optical fibres.

It should be noted that the combination of a waveguide and an associated substrate will be referred to hereinafter as a waveguide substrate.

According to one aspect of the present invention, a method of affixing a single-mode optical fibre to a waveguide substrate in optical alignment with a waveguide thereon comprises the steps of:

(a) preparing an end of the fibre such as to have a planar end-face substantially normal with respect to the fibre axis, (b) extending the potential area of contact between the fibre end-face and the waveguide substrate by mounting on the surface of the substrate in which the waveguide is embedded a support block which straddles the waveguide and which has an end-face substantially co-planar with the termination of the waveguide, (c) optically aligning the fibre end and the waveguide, and (d) affixing the end-face of the optical fibre with transparent adhesive to the waveguide substrate and block such that the optical fibre is butt-jointed to the substrate and block by the transparent adhesive to maintain axial alignment of the optical fibre and the waveguide.

According to another aspect of the present invention, a connection between a single mode optical fibre and a waveguide on a waveguide substrate comprises:

(a) a waveguide substrate having one or more waveguides embedded therein near one surface thereof, (b) a single mode optical fibre, having a planar end-face substantially normal with respect to the fibre axis, in optical alignment with the waveguide, (c) a support block having an end-face substantially co-planar with the termination of the waveguide and being mounted on the surface of the substrate in which the waveguide is embedded so as to straddle the waveguide, (d) and transparent adhesive affixing the end-face of the optical fibre to both the waveguide substrate and block said optical fibre, waveguide substrate and block being disposed such that the optical fibre is butt-jointed to the substrate and block by the transparent adhesive to maintain axial alignment of the optical fibre and the waveguide.

It should be noted that the term "transparent" is to be understood as meaning "transparent at the wavelength of operation". Thus, for use at an infrared wavelength of 1500 nm, for example, it is important that the adhesive be transparent at that wavelength, but not necessarily be so as visible wavelengths. Equally, the term "refractive index" below is to be understood as meaning "refractive index at the wavelength of operation".

The adhesive is conveniently a light curable adhesive, and preferably a white light curable adhesive.

Connections between single mode fibres and waveguide substrates made in accordance with the present invention have been shown to give an acceptably strong mechanical joint between the fibre and the waveguide substrate, without introducing unacceptably high coupling losses between the fibre core and the waveguide.

The interface or contact area of the support block with the waveguide should have a refractive index which does not greatly exceed the refractive index of the waveguide, since a region of too large a refractive index next to the waveguide would cause increased losses in the wave guide. Therefore, the interface or contact area preferably has a refractive index equal to or lower than the refractive index of the waveguide. This requirement can be readily complied with by affixing the support block to the substrate by means of an adhesive of suitable refractive index, so that the interface is formed by the adhesive interposed between the waveguide and the support block.

The support block conveniently comprises similar, and preferably the same, material as the waveguide substrate.

In the case where there are two or more waveguides on a substrate, the support block may extend over several adjacent waveguides. In this case also two or more fibre to waveguide connections may be made to the same substrate by the method of the present invention.

The adhesive used for affixing the support block may conveniently be the same as that used for fixing the fibre to the waveguide.

Polishing the edges of the substrate and the support block separately, and mounting the support block by the method of the present invention after deposition of the desired device structure (e.g. metallisation) is substantially complete, has appreciable advantages over mounting the support block early during fabrication and polishing the end face of the support block and the substrate together. Firstly, a polishing step late in the fabrication process is undesirable because of the possibility of causing damage to the finished device. Damage caused at a late stage of device fabrication can considerably reduce the yield and hence increase the cost of devices because of the waste in processing time already spent on the devices. Moreover, it has been found that the greater accuracy in alignment provided by polishing after assembly is unnecessary, as any minor (to within about plus or minus 5 $\mu$m) misalignment between the edges of the block and the substrate can be adequately compensated for by variations in the thickness of the adhesive. The only essential alignment is laterally, and can be achieved by the method of present invention.

BRIEF DESCRIPTION OF THE DRAWINGS

An embodiment of the present invention will now be described by way of example only, illustrated with the aid of the accompanying Figures of the accompanying drawings, of which.

DETAILED DESCRIPTION

The following description is of a method of jointing both an input and an output fibre to a single optical waveguide on a lithium niobate substrate and resulting optical fibre to waveguide connections.

Figure 1:
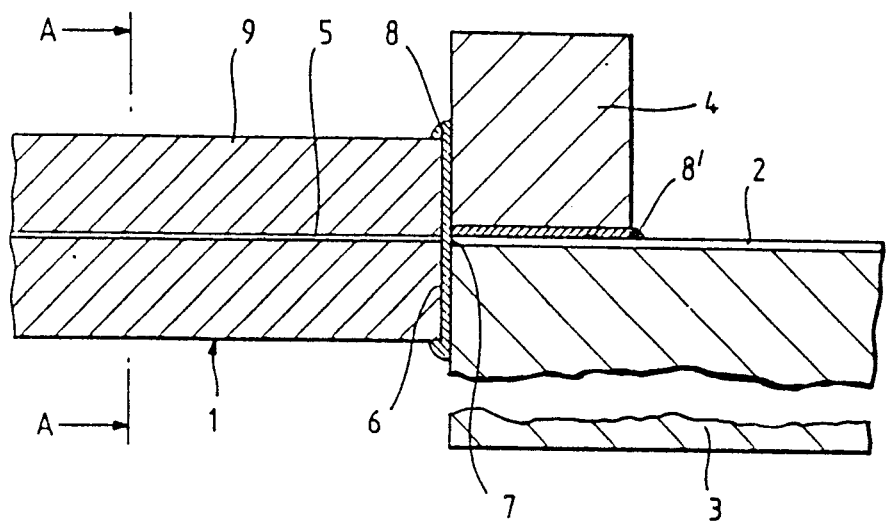
FIG. 1 shows a cross-section of the an optical fibre fixed in optical alignment with a waveguide on a substrate by a method according to an embodiment of the present invention.
Figure 2:
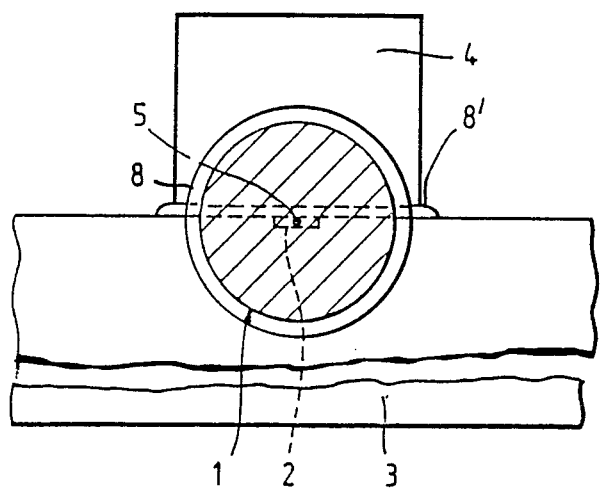
FIG. 2 shows a cross section taken along the line A—A in FIG. 1, viewed in the direction indicated by the arrows.

Referring now also to the drawings, FIGS. 1 and 2 are schematic diagrams of a joint connecting an optical single mode fibre 1 to a waveguide 2 of a waveguide substrate 3.

The optical fibre 1 is a single-mode fibre comprising a cladding 9, around 0.1 mm in diameter, which surrounds a single mode core 5, of around 0.005 mm diameter, forming the light-guiding structure of the fibre 1.

The optical waveguide substrate 3 consists of a rectangular slab of lithium niobate which is a few cm long, about one cm wide, and of the order of one mm thick. Embedded in one of the two largest sides are one or more waveguides 2 (only one of which is shown in the drawings), which typically run parallel to the long sides of the slab and terminate across the width of the slab.

The waveguides 2 are formed by narrow strips which have a higher refractive index than the neighbouring substrate material. Methods of forming the waveguides are known in the art and, not being pertinent to the present invention as such, will not be described here.

Secured to that side of the substrate 3 which carries the waveguide 2 is a support block 4, also of lithium niobate. The block 4 as shown in the Figures straddles a single waveguide. In practice the block will often extend the full width (i.e. the side shown face-on in FIG. 2) of the waveguide substrate 3 and often straddle more than one waveguide.

The support block 4 is secured to the substrate by means of a layer 8′ of adhesive. The optical fibre 1 is butt-jointed to the substrate 3 and the block 4 by a layer 8 of adhesive.

Making the fibre to waveguide joint with correct optical alignment of the core 5 with the waveguide 2 is achieved as follows:

The fibre endface 6 (FIG. 1) is prepared by cleaving the fibre such that the fibre endface is substantially normal to the fibre axis. Methods by which fibre endfaces may be cleaved as required are known and are not therefore described herein.

The block 4 of lithium niobate is mounted on the waveguide substrate 3 adjacent to the termination 7 of the relevant waveguide 2. One of the sides of the block 4 is brought into alignment with that side of the waveguide substrate 3 at which the waveguide terminates, and bonded to the substrate 3 with adhesive layer 8′.

Next the core 5 of the fibre 1 is aligned with the waveguide 2, and the endface of the fibre 1 is glued to both the waveguide substrate 3 and the block 4, as follows.

The block 4 is mounted on the waveguide substrate 3 by means of an adhesive 8′ which is curable by exposure to white light. The adhesive 8′ used was Durafill Bond, manufatured by KULZER and Co., Wehrheim, a photocuring intermediate liner for tooth fillings. The adhesive, when cured, has a refractive index of less than that of the lithium niobate substrate. The block 4 is also constructed out of lithium niobate and its cross section is rectangular. It is disposed such that a first face lies in parallel contact with the waveguide substrate 3, and a second face is coplanar with the endface of the substrate 3.

A convenient means of aligning the endface of the substrate 3 and the second face of the block 4 is to bring them both into abutment with a common planar surface before curing of the adhesive 8′. Referring to FIG. 2, the block 4 is positioned so that it straddles the waveguide 2, being in contact not only with the waveguide surface but also with the surface of the substrate 3 to either side of the embedded waveguide 2.

Figure 3:
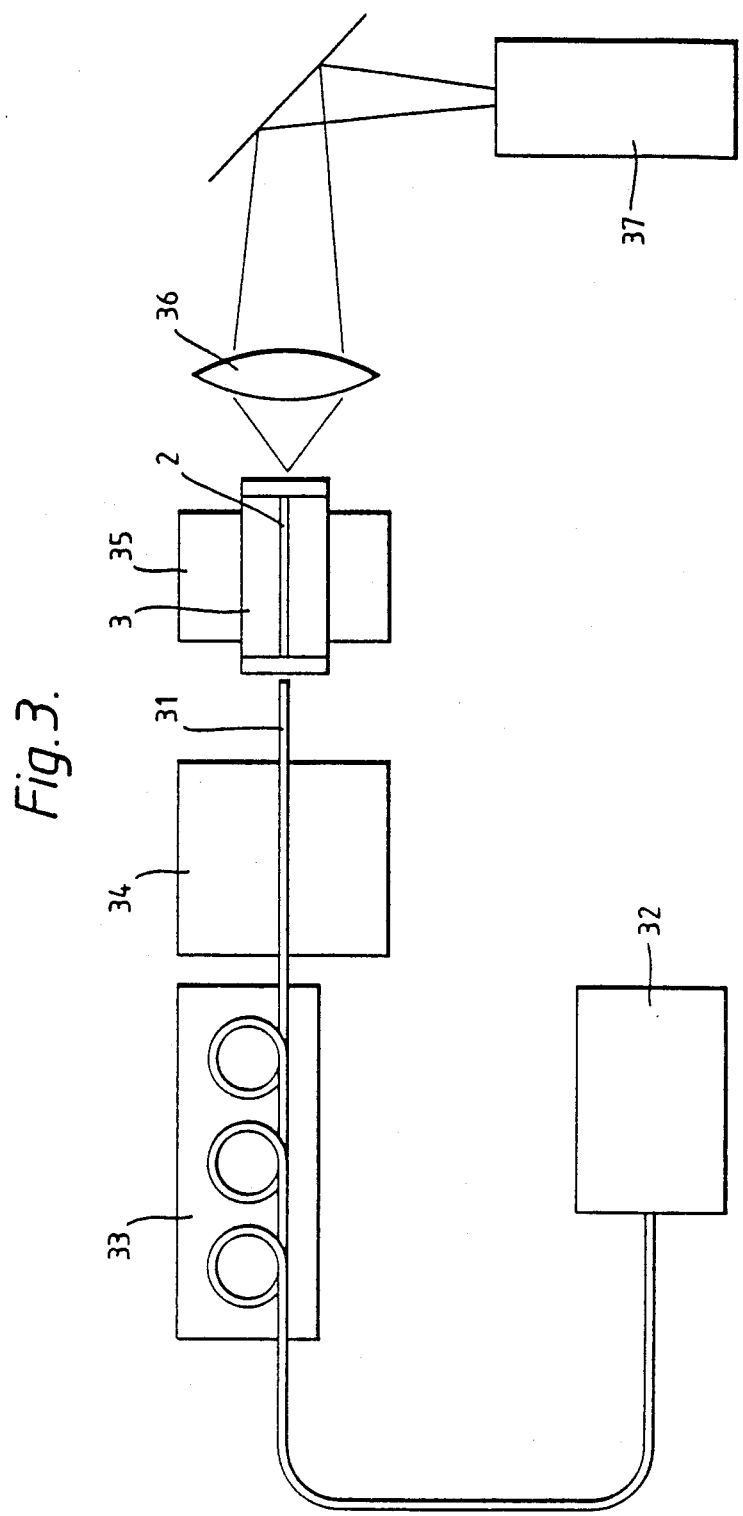
FIG. 3 shows a schematic layout of equipment for use in aligning an input fibre with a waveguide on a substrate.
Figure 4:
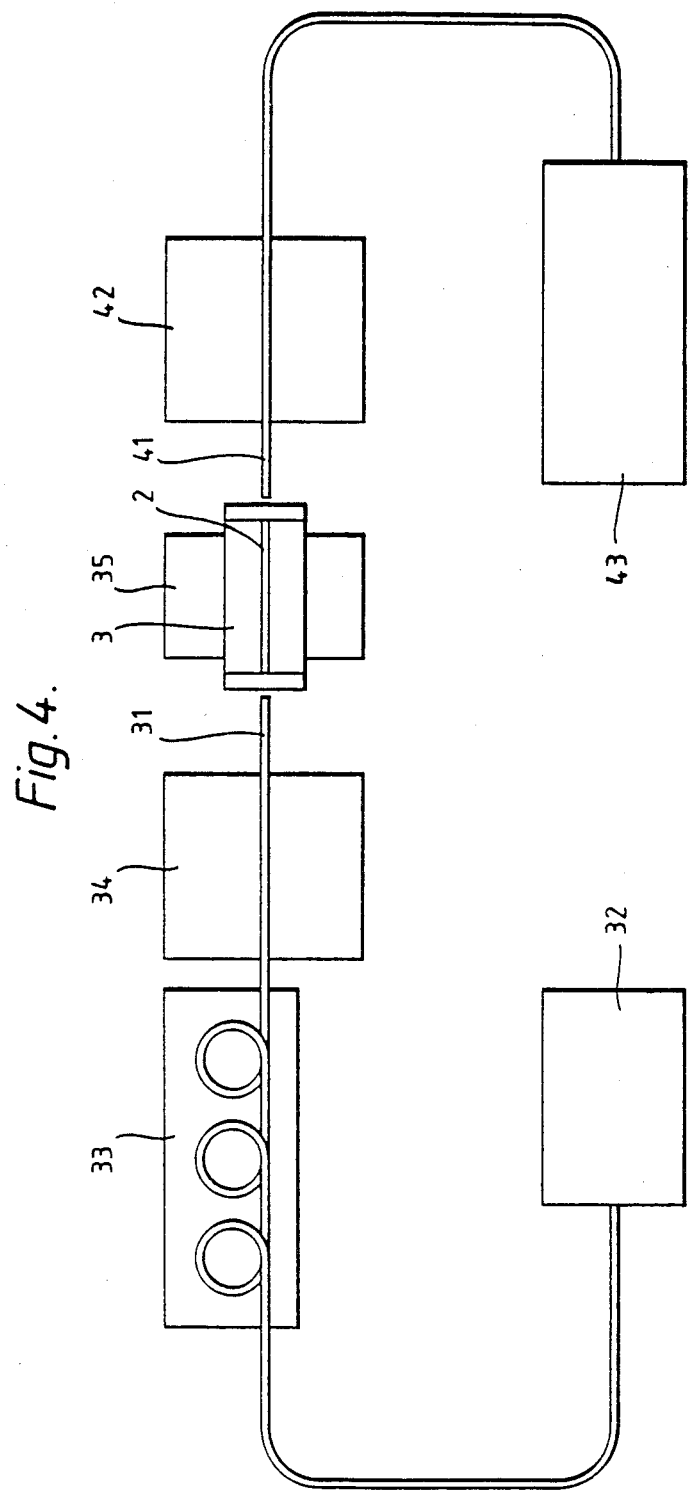
FIG. 4 shows a schematic layout of equipment for use in aligning input and output fibres to a waveguide on substrate, and fixing them thereto.

Referring now specifically to FIGS. 3 and 4, the end of input fibre 31 is first clamped to a micropositioner 34 with three translational directions of adjustment (i.e., it permits fibre movement up and down, left and right, and along the fibre axis) and two rotational or angular directions of adjustment (i.e., it permits the rake and the tilt of the fibre to be adjusted). The angular adjustments are used to bring the endface of the fibre 31 to lie perpendicular to the beam of a HeNe laser (not shown), which also defines an optical axis for the equipment. The fibre 31 is mode stripped to remove the cladding modes.

The waveguide substrate 3 is mounted in a package which allows access to the terminations of the waveguide 2 at both ends of the substrate. The package itself is mounted on a goniometric head 35 which provides precise angular orientation. The endfaces of the waveguide substrate 3 are also brought to lie perpendicular to the beam of the laser.

An optical source 32 is coupled to the end of the input fibre 31 which is remote from the waveguide substrate 3. The optical source 32 is a packaged semiconductor laser with a single mode fibre tail. The fibre 31 is passed through a polarization controller 33 which enables either TE or TM fields to be selected.

The end of the fibre 31 is then moved into alignment with the waveguide 2 by using the linear adjustment facilities of the micropositioner 34 and viewing the output termination of the waveguide 2 with a $\times 5$ microscope objective 36 when the optical source 32 is activated. The image obtained from the objective is displayed using a video camera and monitor 37.

The position of the input fibre 31 is varied until an intense near field mode pattern of the waveguide 2 is observed. To prevent Fabry-Perot cavity effects between the end of the fibre 31 and the waveguide 2 and to increase the stability of the launch conditions, a coupling gel is used. The refractive index of the gel is matched to that of the fibre 31.

After the above alignment step the imaging equipment, i.e. the objective 36 and camera/monitor 37, is removed.

Referring to FIG. 4, next, one end of the output 41 is mode stripped and coupled to a calibrated photodiode 43. The other end is attached to another micropositioner 42 and angularly aligned with the optical axis provided by the He Ne beam mentioned above. The linear adjustments of the micropositioner 42 are then used to align the fibre 41 roughly with the waveguide 2 and a small quantity of light curable adhesive is then introduced between the end of the fibre 41 and the waveguide substrate and support block about the waveguide output termination. The refractive index of the adhesive closely matches that of the fibre 41. The two fibres 31, 41 are then maneuvered in turn until the power measured on the photodiode 43 is at a maximum. At this state, the adhesive between the output fibre 51 and the waveguide 2 is exposed to white light, so fixing the fibre 41 to the termination of the waveguide 2 and to the surfaces of the substrate 3 and of the block 4 which lie adjacent to that termination. Hence a joint of the type shown in FIGS. 1 and 2 is produced.

The power measured on the photodiode 43 may be monitored during curing of the adhesive and additional adhesive may be applied around the joint to improve its strength. Finally, adhesive is applied remote from the joint to attach the fibre 41 to the base of the package carrying the waveguide substrate 3. This ensures that any strain on the fibre 41 is not transferred directly to the joint.

The index matching gel is then cleaned from the input fibre 31 and the waveguide 2, and replaced by a small quantity of white light curable adhesive. After again realigning the joint to maximise the power meausred on the photodiode 43, the adhesive is cured and the joint attached in the same way as the output joint. Finally package end walls together with a protective fibre sheath (not shown) are added.

Figure 5:
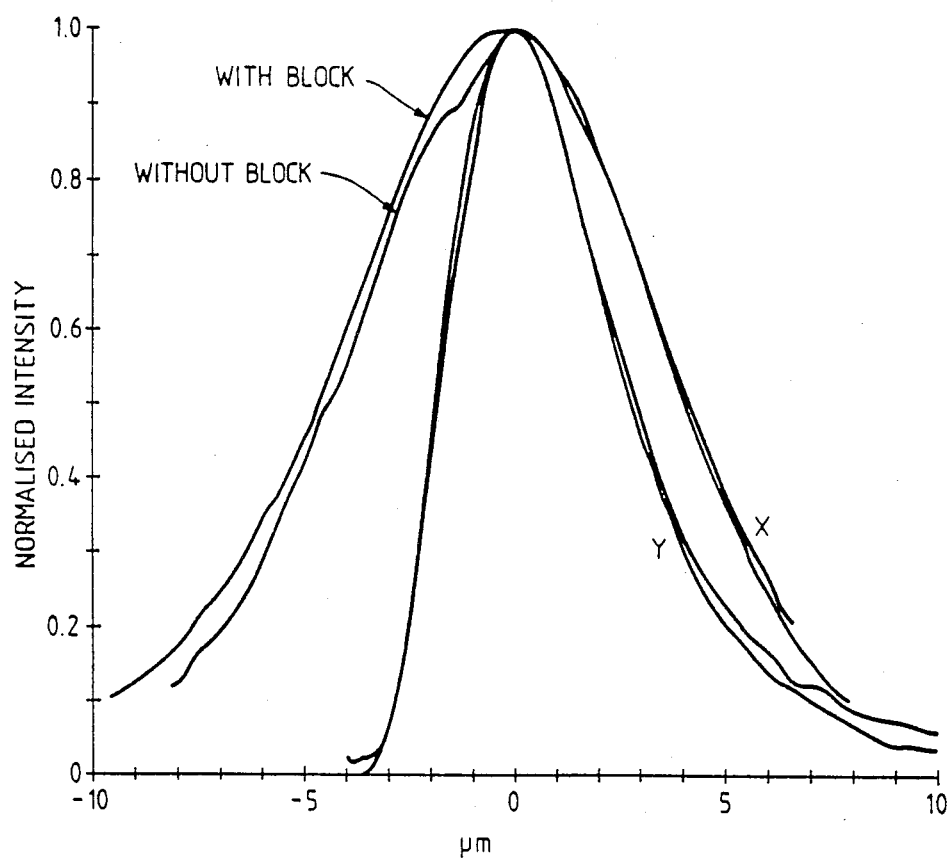
FIG. 5 represents in graph-form the results of comparative near field test measurements of waveguide to fibre connections which were and which were not prepared by a method in accordance with the present invention.

To check the effect of mounting the block 4 of lithium niobate on the waveguide substrate 3, particularly with regard to the guiding propertiets of the waveguide 2, near field light intensity distribution measurements were made on a 10 μm wide guide both before and after the lithium niobate block 4 was attached. Referring to FIG. 5 which shows the results, it can be seen that there was no significant difference between the before and after plots, indicating that the block 4 did not modify the guiding properties of the waveguide 2.

Figure 6:
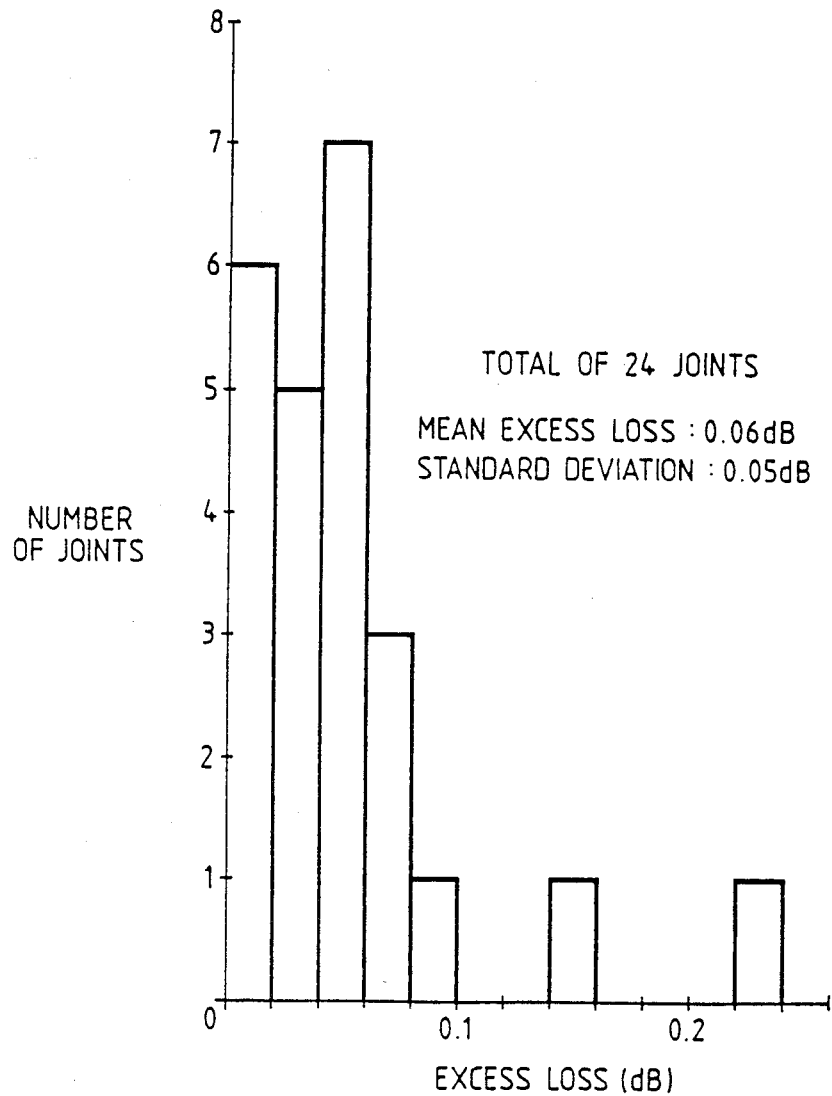
FIG. 6 is a histogram of test loss measurements for a sample number of joints.

FIG. 6 shows the excess loss introduced by the fixing of the joints for a sample of 24 ends. The loss is calculated from the measurements of the power coupled from a waveguide into a fibre before and after the curing of the adhesive. The mean excess loss for the joints was found to be 0.06 dB with a standard deviation of 0.05 dB. It should be noted that the waveguide in question was not optimised for use with the associated fibres e.g. in terms of mode patterns.

The mechanical strength of the joint was assessed by a pull test on the fibre. A joint was made in the normal way but with no additional strain relief on the fibre. The fibre was loaded until the joint broke at a force of 0.7 newtons.

The present invention provides a simple and practical technique for attaching fibres to waveguides on planar substrates. The technique has been used in the packaging of waveguide components, and has been shown to be capable of producing robust joints which introduce only a small additional coupling loss.

Although an embodiment of the invention has been described with reference to only one input fibre 31 and one output fibre 41, in many cases it may be that the waveguide substrate 3 concerned comprises a plurality of waveguides embedded in parallel in one surface of the substrate. In such a case it may be convenient to use a single support block adjacent the endfaces of the substrate and mounted so as to straddle all the waveguides of the substrate which terminate at the end.

The refractive index of the adhesive used to mount the block 4 on the waveguide substrate 3 will generally be selected to be less than or equal to the refractive index of the substrate. The refractive index of any material adjacent to the waveguide may affect its optical guiding properties. Because of the small dimensions relevent to a waveguide which is generally about 10 μm in width, it will normally be the refractive index of the adhesive rather than that of the block 4 itself which will dictate the effect on the waveguide's properties of mounting the block 4 to straddle the waveguide 2. If the adhesive's refractive index is less than that of the substrate, light will not generally be coupled out of the waveguide into the adhesive. However in certain circumstances such coupling may be desirable and the refractive index of the adhesive, and possibly also that of the block 4, may then be selected to be greater than that of the substrate.

Acceptable coupling losses have been achieved with joints in which there is an offset between the polished face of the block 4 and the termination of the waveguide 2 of up to 5 μm. The extent to which such an offset is likely to be acceptable may affect the means used to mount the block 4 on the waveguide substrate 3.

Although both the block 4 and the substrate are described as being of lithium niobate material, they may be of other suitable material. Also, instead of using white light curable adhesive as described, other types of adhesive may be employed, provided it complies with the requirements as to refractive index and, possibly, strength.

The above described process may be at least partly automated by using suitable control circuitry, for example microprocessor control for performing the alignment operations. Also, the method can be used to attach more than one input or output fibre to substrates with two or more waveguides.

I claim:

1. A method of affixing a single-mode optical fibre to a waveguide substrate in optical alignment with a waveguide thereon comprising the steps of:
    (a) preparing an end of the fibre such as to have a planar end-face substantially normal with respect to the fibre axis,
    (b) mounting on the surface of the substrate in which the waveguide is embedded a support block which straddles the waveguide and which has an end-face substantially co-planar with the termination of the waveguide;
    (c) optically aligning the fibre core and the waveguide, and
    (d) affixing the end-face of the optical fibre with transparent adhesive to the waveguide substrate and block such that the optical fibre is butt-jointed to the substrate and block by the transparent adhesive to maintain axial alignment of the optical fibre and the waveguide.

2. A method as claimed in claim 1 employing a light curable adhesive.

3. A method as claimed in claim 2 employing a white light curable adhesive.

4. A method as claimed in any preceding claim employing a support block of material similar to that of the waveguide substrate.

5. A method as claimed in claim 1, 2 or 3 employing a support block comprising the same material as the waveguide substrate.

6. A method as claimed in claim 1, 2 or 3 comprising mounting a support block which extends over several adjacent waveguides.

7. A method as claimed in claim 1 wherein the support block is mounted on the surface of the substrate by means of an ahesive which is the same as that used for affixing the fibre to the waveguide.

8. A connection between a single-mode optical fibre and a waveguide on a waveguide substrate comprising:
    (a) a waveguide substrate having one or more waveguides embedded therein near one surface thereof,
    (b) a single-mode optical fibre, having a planar end-face substantially normal with respect to the fibre axis, in optical alignment with the waveguide,
    (c) a support block having an end-face substantially co-planar and being mounted on the surface of the substrate in which the waveguide is embedded so as to straddle the waveguide,
    (d) and transparent adhesive affixing the end-face of the optical fibre to both the waveguide substrate and block, said optical fibre, waveguide substrate and block being disposed such that the optical fibre is butt-jointed to the substrate and block by the transparent adhesive to maintain axial alignment of the optical fibre and the waveguide. disposed such that the optical fibre is butt-jointed to the substrate and block by the transparent adhesive to maintain axial alignment of the optical fibre and the waveguide.

9. A connection as claimed in claim 8 wherein the adhesive is a light curable adhesive.

10. A connection as claimed in claim 8 wherein the adhesive is a white light curable adhesive.

11. A connection as claimed in any one of claims 8 to 10 having an interface or contact area between the block and the waveguide of a refractive index equal to or lower than the refractive index of the waveguide.

12. A connection as claimed in claim 11 wherein the support block is affixed to the substrate by means of an adhesive of suitable refractive index, which adhesive forms the interface between the waveguide and the support block.

13. A connection as claimed in any one of claims 8 to 10 wherein the support block comprises similar material as the waveguide substrate.

14. A connection as claimed in any one of claims 8 to 10 wherein the support block comrpises the same material as the waveguide substrate.

15. A connection as claimed in any one of claims 8 to 10 wherein the support block extends over several adjacent waveguides.

16. A connection as claimed in any one of claims 10 to 15 wherein the adhesive used for affixing the support block is the same as that used for fixing the fibre to the waveguide substrate.

* * * * *